J. A. GRAY.
CAN FEEDING AND RE-FORMING AND END APPLYING MACHINE.
APPLICATION FILED MAR. 8, 1917.

1,370,807.

Patented Mar. 8, 1921.
3 SHEETS—SHEET 1.

WITNESS.
J. D. Thornburgh.

INVENTOR.
James A. Gray
BY
D. A. Acker
ATTORNEY.

J. A. GRAY.
CAN FEEDING AND RE-FORMING AND END APPLYING MACHINE.
APPLICATION FILED MAR. 8, 1917.

1,370,807.

Patented Mar. 8, 1921.

WITNESS.
J. D. Thornburgh.

INVENTOR.
James A. Gray
BY
D. D. Acker
ATTORNEY.

UNITED STATES PATENT OFFICE.

JAMES A. GRAY, OF SAN FRANCISCO, CALIFORNIA, ASSIGNOR TO AMERICAN CAN COMPANY, OF SAN FRANCISCO, CALIFORNIA, A CORPORATION OF NEW JERSEY.

CAN FEEDING AND RE-FORMING AND END-APPLYING MACHINE.

1,370,807. Specification of Letters Patent. Patented Mar. 8, 1921.

Application filed March 8, 1917. Serial No. 153,311.

*To all whom it may concern:*

Be it known that I, JAMES A. GRAY, a citizen of the United States, residing at the city and county of San Francisco and State of California, have invented certain new and useful Improvements in Can Feeding and Re-Forming and End-Applying Machines, of which the following is a specification.

The hereinafter described invention relates to an organized apparatus for successively receiving can bodies from a non-timed carrier, advancing the same by an accelerated speed and delivering the same in spaced and timed relation to a continuously traveling member for subsequent operation thereon, reforming or truing the can bodies during the advance thereof through the machine, and loosely applying can ends to the said can bodies prior to the discharge thereof from within the sphere of the machine.

In the making of cans, it is common practice to transfer can bodies from the body making machine to the machines for subsequent operations by means of conveyers. The can bodies are usually advanced by said conveyers without any regard to timing or spacing, but said can bodies must be placed into a proper timed relation in order that the subsequent operations may be properly carried out.

It is the object of the present invention to provide an apparatus in which the can bodies are successively removed from a conveyer or feed means and the speed thereof gradually accelerated as advanced through the machine and placed in timed relation and so advanced and delivered to a continuously moving apparatus for carrying out subsequent operations, such, for example, as the double seaming of an end thereupon. There is associated with the mechanism for transferring the can bodies successively from the feed conveyer to the apparatus for carrying out of subsequent operation, means for loosely applying can ends thereto, and, in addition the can bodies are trued up and restored to their original form in case they should have been deformed or flattened after leaving the can body forming mechanism. A further object of the invention is to provide a machine in which the described operations are carried out during the continuous movement or advance of the can bodies from the feed conveyer or carrier toward the continuously operated apparatus for carrying out subsequent operations, so that the various parts of the machine may not be subjected to the inevitable strains and wear attendant upon intermittent operations.

It will be clearly brought out in the following description that the can bodies are received at one end of the machine without regard to the timing or spacing thereof and are continuously advanced through the machine by a gradually accelerated rate of speed and discharged therefrom in proper timed and spaced relation within the sphere of a continuously traveling member for carrying out of subsequent operations, and that during this accelerated advance of the can bodies as conveyed toward the continuously traveling member the said can bodies are reformed and trued and can ends loosely applied thereto.

In order to comprehend the invention, reference should be had to the accompanying sheets of drawings, wherein—

Figure 1:
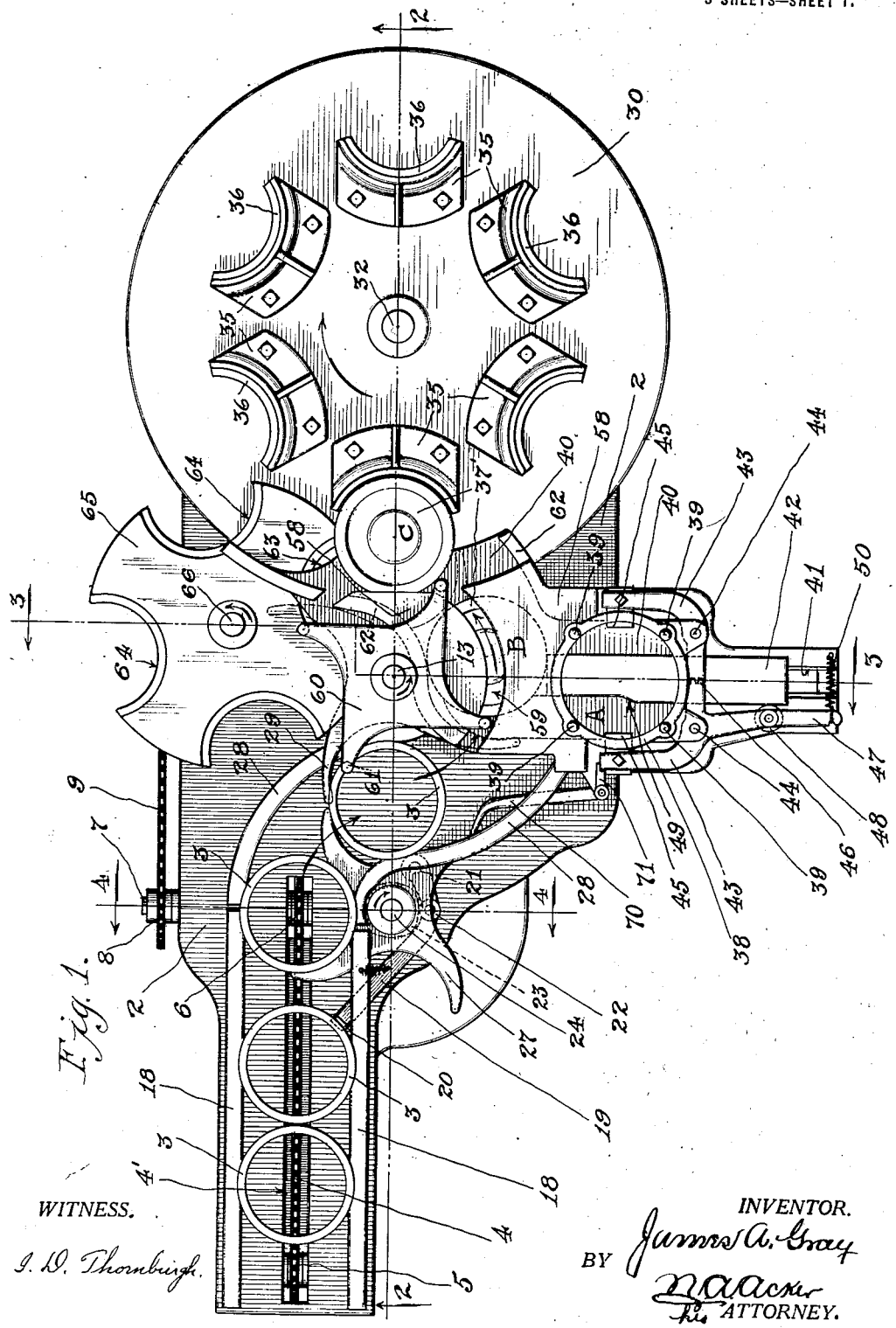
Figure 1 is a plan view of the complete machine.

In the drawings, the reference numeral 1 represents a suitable body or frame capable of sustaining the working parts of the machine, upon which is supported a horizontal feed table 2. The irregularly fed open ended cans 3 are introduced into the machine on said feed table 2, and are advanced thereupon by a feed chain 4, whose upper run lies within a slot 4', Fig. 1 of the drawings, formed in said feed table 2. Said chain 4 is carried upon suitable sprockets 5 and 6, the latter being mounted upon a transverse shaft 7, Figs. 1, 2 and 4, which is journaled in the frame 1, and carries upon its outer end a sprocket 8, the latter being connected by means of a chain 9, Figs. 1, 2 and 3 of the drawings, with a lower transverse shaft 10. Said shaft 10 is driven through bevel gears 11 and 12, Fig. 3 of the drawings, from a vertical shaft 13, the latter being driven through meshing bevel gears 14 and 15, Fig. 2 of the drawings, from a horizontal lineally disposed drive shaft 16 carrying at its outer end a belt pulley 17, or other means for receiving power from any outside source of supply not shown in the drawings. Guide rails 18, Figs. 1 and 2 of the drawings, are mounted above the feed table 2 for the purpose of guiding the advancing can bodies 3.

Preferably, the feed chain 4 carries no lugs or flights and is not necessarily in timed relation with the succeeding mechanism. The cans, as brought over the feed table 2 by said chain, are stopped by a timer finger 19, Figs. 1 and 2 of the drawings, whose free end 20 normally projects into the path of travel of said cans. Said timer finger 19 is pivoted at 21, Fig. 1 of the drawings, and carries a cam following roller 22, Figs. 1 and 4 of the drawings, adapted to be actuated by a cam 23, carried on the upper end of a vertical shaft 24. Said shaft 24 is suitably journaled in the frame of the machine and is driven by means of meshing gears 25 and 26, Fig. 2 of the drawings, the latter being mounted upon the vertical shaft 13. The upper end of the vertical shaft 24 also carries a star wheel 27, Fig. 1 of the drawings, the curved arms of which are adapted to engage and advance the can bodies 3 from within the sphere of the carrier chain 4. The timer finger 19 is actuated by its cam 23 to release the can body 3 held thereby at the proper time to enable said can body to be engaged by one of the arms of the can feed star wheel 27, which said can is then advanced by said star wheel 27, between the curved guide rails 28, to a point at which it is engaged by a second can feed star wheel 29, Figs. 1 and 2 of the drawings, which star wheel 29 is mounted upon the vertical shaft 13 and is timed to receive the can body from the first star wheel 27 and advance the same with accelerated speed between the curved guide rails 28. This accelerated speed results from the fact that while the wheels 27 and 29 do or may have the same angular speed, the ends of the arms of the latter wheel have a greater linear speed than the ends of the arms of the wheel 27, being further from the axis of rotation. In this respect the construction may be substantially the same as in the patent to Fleischer No. 1,212,754, granted Jan. 16, 1917. At the end of the machine opposite the feed table 2, is shown a horizontally rotatable turret 30, Figs. 1 and 2 of the drawings, which may form a part of any desired apparatus for carrying on any subsequent operation upon the can, as, for example, seaming an end to the can body. In the drawings, I have not shown any portions of this apparatus other than the turret 30, for the reason that said other portions constitute no part of the present invention. It is to be understood, however, that the turret 30 may form a part of the machine for carrying out any desired operation upon the can and can end.

Figure 2:
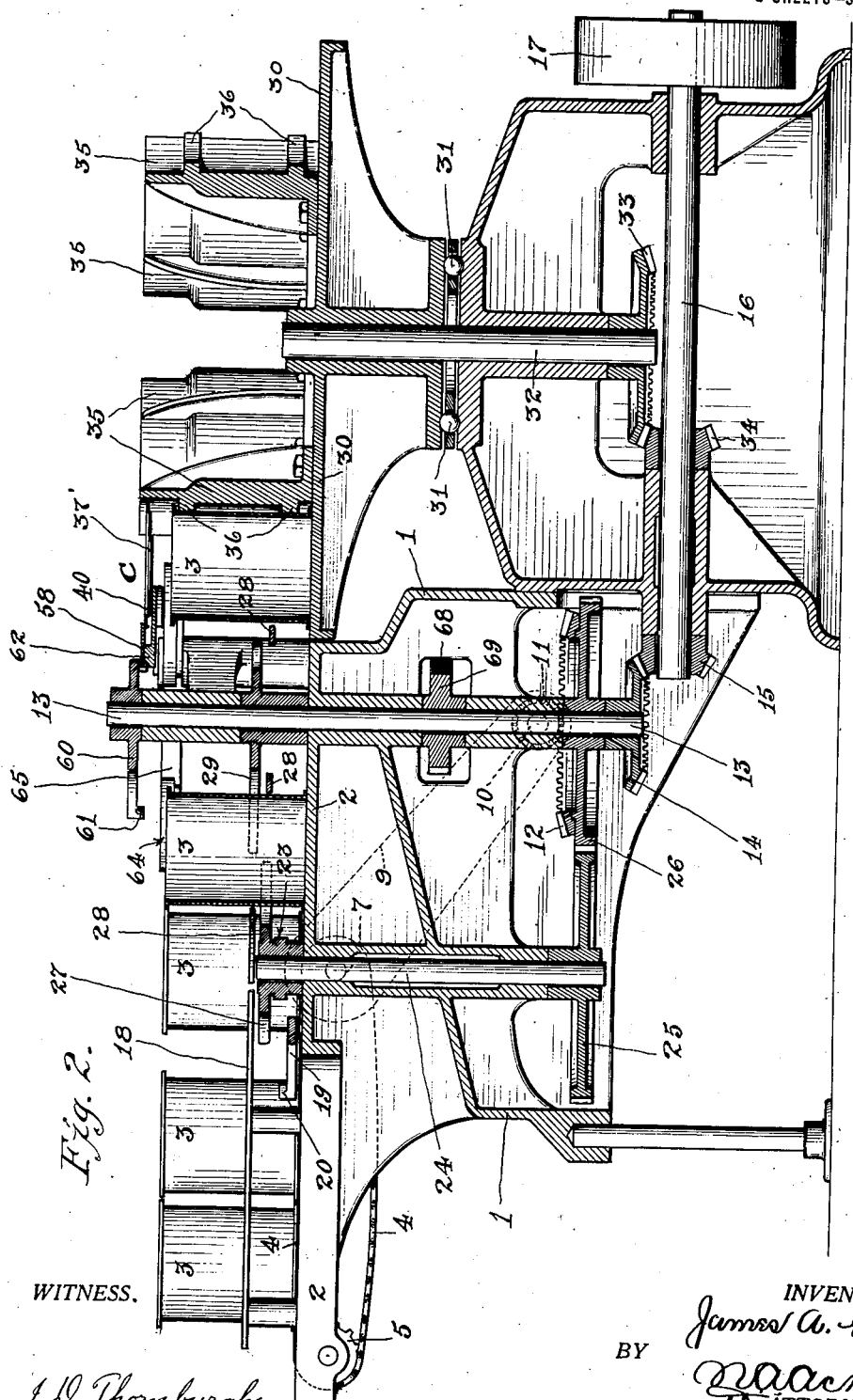
Fig. 2 is a sectional elevation of the machine taken on the line 2—2 of Fig. 1, viewed in the direction of the arrows.

The turret 30 is carried upon a suitable bearing 31, Fig. 2, and is rotated by means of a shaft 32 driven from the main driving shaft 16, by means of bevel gears 33 and 34. The turret 30 is to be continuously rotated in timed relation with the said mechanism above described.

Said turret 30 is positioned flush with the feed table 2 and carries a series of radially disposed can receiving recess pockets 35, each formed as shown in Fig. 2 of the drawings, with upper and lower can engaging flanges 36. The cans, as advanced by the second star wheel 29 from off the table 2, are moved onto the turret 30, and deposited one within each of the pockets 35, the three vertical shafts 13, 24 and 32 being properly timed for this purpose.

Figure 3:
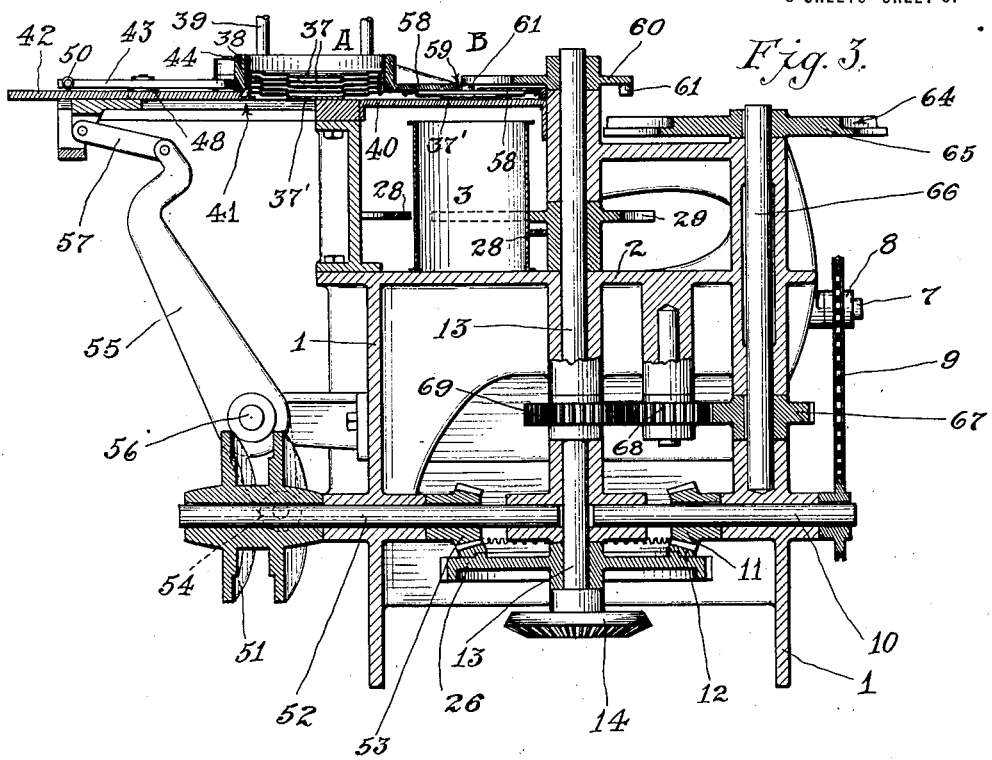
Fig. 3 is a transverse section taken on the line 3—3 of Fig. 1, and viewed in the direction of the arrows.
Figure 4:
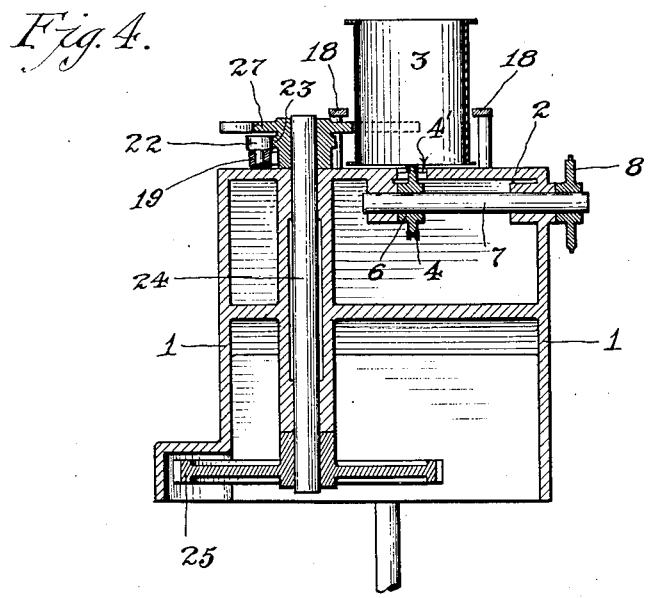
Fig. 4 is a transverse section taken on the line 4—4 of Fig. 1, and viewed in the direction of the arrows.

At one side of the machine, above the feed table 2, is located a holder or magazine, adapted to contain a stack of can ends 37, Figs. 1 and 3 of the drawings. Said holder comprises preferably a lower ring 38 and four vertically disposed rods 39. The bottom of said holder is formed by a plate 40, having guideways 41 formed therein, within which is carried a lineally slidable can end feed bar 42, said feed bar being adapted to engage the lowermost can end 37' of the stack of ends within the holder and to push said lowermost can end out from beneath said holder over the bottom plate 40.

A pair of horizontally swinging arms 43, Fig. 1 of the drawings, fulcrumed at 44, and carrying at their inner ends inwardly projecting fingers 45 are adapted to be inserted between the lowermost can end 37' of the stack of can ends 37 and the end next above, for the purpose of raising said stack of ends to free said lowermost can end 37'. Said arms 43 are interconnected at 46, preferably by means of interengaging teeth, to provide for the simultaneous operation of both, and one of said arms carries an outwardly extending lever 47, having mounted thereon a cam following roller 48, the latter being adapted to follow a cam surface 49 formed in one side of the can end feed slide 42. A spring 50 holds said roller 48 in contact with said cam surface 49.

The can end feed slide 42 is actuated by means of a groove cam 51 mounted upon the outer end of a horizontal shaft 52, Fig. 3 of the drawings, whose inner end carries a bevel gear 53, adapted to mesh with and be driven by the bevel gear 12 upon the vertical shaft 13—Fig. 2 of the drawings. A roller 54, running within said cam groove 51, is mounted upon and actuates a lever 55, fulcrumed at 56, and connected at its upper end, by means of link 57, with the can end feed slide 42. Thus it will be seen that as the feed slide 42 moves outwardly, the swinging arms 43, Fig. 1 of the drawings, move inwardly to raise the stack of can ends 37, with the exception of the lowermost end 37′, Fig. 3 of the drawings, so that the subsequent inward movement of said feed slide 42 pushes said lowermost end 37′, at the position A, Fig. 3 of the drawings, out from beneath the magazine and into the position B—Figs. 1 and 3 of the drawings, in which position said end 37′ is in substantial vertical alinement with the advancing can body 3. During said discharge of the can end from the magazine, said end rests upon the plate 40 and is guided by an upper plate 58, spaced therefrom, and provided with an arcuate slot 59.

A third star wheel 60, Figs. 1, 2 and 3 of the drawings, is mounted upon the upper end of the vertical shaft 13 and carries upon its arms downwardly extending lugs 61 adapted to pass through the slot 59 in the plate 58, and to engage the can end 37′ lying in the position B. Said can end is then advanced by said third star wheel 60, being guided by suitable rails or guides 62, to the position C, Figs. 1 and 2 of the drawings. In this position the can end 37′ overhangs the lower plate 40, but is prevented from dropping off said plate by the upper guide plate 58. In this position, moreover, the can end rests partly within one of the can pockets 35 of the rotating turret 30, and is therefore in vertical alinement with the can body 3 carried within said pocket.

Continued rotation of the turret 30 carries the can body 3 and its alined can end 37, the latter still resting upon the plate 40, to a position in which said can end falls off the cut out edge 63 of said plate 40, Fig. 1 of the drawings, and lowers upon the can body 3 situated beneath and in axial alinement with the can end. During this movement also the can body 3 is clamped between the pocket 35 and a semi-circular recess 64 formed in a fourth star wheel 65. The forms of the pocket 35 and the recess 64 in the star wheel 65, are such as to coöperate to embrace the body 3 closely, and to thereby restore the same to its original form, if said body is slightly distorted. The star wheel 65 is carried upon the upper end of a vertical shaft 66, suitably journaled in the frame, and driven by means of a train of gears 67, 68 and 69, Fig. 3, from the vertical shaft 13.

Provision is made for preventing the feeding of a can end in case no can body is present to receive it. For this purpose a pivoted finger 70, Fig. 1 of the drawings, is interposed in the path of the can bodies 3 advanced by the star wheel 29 toward the turret 30. Said finger actuates a trigger 71, which normally holds the swinging arms 43 in their inward positions. When a can body 3, advanced by the star wheel 29, moves the finger 70 aside, the arms 43 are released by the trigger 71, and are allowed to operate to release the lowermost can end 37′ of the stack contained within the holder; but if no can body is present to actuate said finger 70, the arms 43 will be held inoperative, and will therefore not release a can end from the stack of ends contained within the holder.

The operation of the machine may be briefly summarized as follows:—Open ended can bodies are placed in any suitable manner upon the feed table 2, between the guide rails 18, by any means not shown in the drawings, and are advanced by means of the endless traveling feed chain 4. The timer finger 19 and the first star wheel 27 coöperate to advance said can bodies in timed succession between the curved guide rails 28 toward the turret 30 and within the sphere of the second star wheel 29 which further advances said can bodies, and positions the same successively within the can pockets 35 on the turret 30.

A stack of can ends 37 is contained within the holder, and the lowermost end 37′ thereof is removed from the holder and placed in the position B, in time to be engaged by the can end star wheel 60. Said end 37′ is thereupon advanced by said star wheel 60 and is engaged by the can pocket 35 of the turret 30, at the position C. The can body 3 and the can end 37′ are then carried in alinement by said turret 30 until the can end drops off the edge 63 of the plate 40, and is deposited upon the can body 3. At the same time, said body 3 is clamped between the pocket 35 and one of the recesses 64 of the star wheel 65, and is thereby restored to perfect form in case it should be in a deformed condition. The can body, with the end resting thereon, may then be removed from the turret 30, by any convenient form of discharge means not shown in the drawing.

It will be noted that can bodies are successively received from a non-timed feed mechanism and moved from within the sphere thereof and transferred to a continuously moving turret by inter-connected instrumentalities working in timed relation with the said turret, so that the can bodies are delivered successively to the can receiving pockets of said turret; that means are provided for controlling the feeding of the can ends in accordance as to whether a can body is present within a can pocket of the rotating turret to receive a can end, and further that mechanism is provided and associated with the working instrumentalities of the apparatus and actuated in timed relation therewith for truing the can body in case the same should be deformed.

The invention has herein been described and is herewith illustrated in its preferred form. It is to be understood, however, that the invention is not restricted to a machine of the form described and illustrated, for the reason that many changes in form and construction may be made without departing from the spirit of the invention, such changes for example as would be necessary to adapt the machine to cans of forms other than those illustrated. It is therefore my wish to be understood as claiming the invention as broadly as the state of the art will permit.

Having thus described my invention, what I claim as new and desire to protect by Letters Patent is:—

1. In a machine for the described purpose, in combination, means for receiving and continuously advancing a can body by a gradually accelerated speed of travel, opposed continuously rotated devices adapted to grasp the sides of the can and true the same after it has completed its accelerated speed of travel, devices for placing a can end in axial alinement with the can body, and means for delivering can ends successively to said devices.

2. In an apparatus for the described purpose, means for receiving partially deformed can bodies, means for continuously advancing the same in timed relation at a gradually accelerated speed, means for restoring said can bodies to perfect form, and positively acting devices for automatically positioning a can end loosely upon each can body, and means for feeding can ends successively to such positioning devices.

3. In a machine for the described purpose, in combination, means for receiving partially deformed can bodies, a rotary device for receiving and advancing said can bodies by a gradually accelerated speed of travel and in spaced relation, opposed continuously rotating devices adapted to grasp the sides of the cans and true the same to perfect form, oppositely acting means for automatically positioning a can end upon each can body, and means for feeding can ends successively to said positioning means.

4. In an apparatus for the described purpose, in combination, means for receiving a can body, a rotary device for receiving and advancing said body continuously through the machine with a gradually accelerated speed of travel, opposed continuously rotating devices adapted to grasp the sides of the can and true the same, and positively acting means for positioning a can end upon said can body, the said grasping and truing devices being located at a point subsequent, in the travel of the can body, to the point at which are located said can end positioning means.

5. In an apparatus for the described purpose, means for successively receiving can bodies, devices for advancing the same in a curvilinear path through the machine by a gradually accelerated speed of travel and in timed relation, means for engaging said can bodies for the truing thereof, and positively acting devices for loosely positioning can ends upon said can bodies, and means for feeding can ends successively to such positioning devices.

6. In an apparatus for the described purpose, means for successively receiving can bodies, devices for advancing the same in a curvilinear path through the machine by a gradually accelerated speed of travel and in spaced relation, means for receiving and holding a supply of can ends, and positively acting devices for successively removing said ends and loosely positioning the same upon said can bodies.

7. In an apparatus for the described purpose, means for successively receiving can bodies, a plurality of rotary devices for advancing said bodies successively by a gradually accelerated speed of travel and in timed relation, and positively acting means for automatically positioning a can end loosely upon each can body, and means for feeding can ends successively to such positioning devices.

8. In an apparatus for the described purpose, means for receiving and advancing a succession of can bodies by a gradually accelerated speed of travel and in timed relation, means for receiving and holding a supply of can ends, devices for successively removing said ends from said holding means, and positively and loosely positioning the same upon said advancing can bodies, and means actuated by the presence of a can body for controlling the operation of said end feeding device.

9. In an apparatus for the described purpose, means for successively receiving can bodies, means for placing the same in timed and spaced relation and for advancing the same in said relation by a gradually accelerated speed of travel, positively acting devices operating after said accelerated speed has terminated for loosely positioning a can end upon each of said can bodies during the advance thereof, means for feeding can ends successively to said positioning devices and rotary devices for truing said can body prior to the discharge thereof.

10. In an apparatus for the described purpose, in combination, means for receiving can bodies, rotary devices for continuously advancing said can bodies, certain of said devices advancing said can bodies at a gradually accelerated speed of travel, and discharging the same in timed and spaced relation, continuously rotating means acting on the sides of the can bodies for truing said can bodies, and means for feeding can ends successively into alinement with said can bodies.

11. In an apparatus for the described purpose, in combination, means for successively receiving can bodies, a continuously rotating device for advancing said can bodies by a gradually accelerated speed of travel and discharging the same, continuously rotating means acting on the sides of the can bodies for truing the same to original form, and positively acting means for automatically positioning can ends loosely upon said can bodies.

12. In a machine for reforming can bodies and applying ends thereto, in combination, means for continuously advancing can bodies with an accelerating speed of travel, continuously advancing means acting on the sides of said can bodies to reform the same, devices for transferring the cans from said accelerating advancing means to said reforming means, and means for positioning can ends on said can bodies during their said continuous travel through the machine.

13. The combination of traveling devices having means for grasping, confining and truing cans, can-accelerating means for feeding cans to said grasping means, means for moving said devices horizontally to grasp the cans, and mechanism for automatically applying can ends to such cans while they are confined.

14. The combination of traveling devices having means for grasping, confining and truing cans, can-accelerating means for feeding cans to said grasping means, means for moving said devices horizontally to grasp the cans, and mechanism including a can end propelling star wheel for automatically applying can ends to such cans while they are confined.

15. The combination of a rotary turret and star wheel having means for grasping, confining and truing cans, can-accelerating means for feeding cans to said grasping means, means for turning said turret and wheel horizontally to grasp the cans, and mechanism for automatically applying can ends to such cans while they are confined.

16. The combination of traveling devices having means for grasping, confining and truing cans, means for moving said devices horizontally to grasp cans, and mechanism including co-axial star-wheels for feeding such cans and for automatically applying can ends to such cans while they are confined in trued form.

17. The combination of a can body feeder whereby the cans are frictionally propelled, can guiding devices, a can-propelling means whereby said cans are successively engaged and propelled at a relatively low speed, a second can-propelling means for engaging successively said cans delivered from the first can-propelling means and moving them at a relatively higher speed, a can end propelling device moving in time with said second can-propelling means and advancing can ends successively above and in line with the cans engaged by said second can-propelling means and thence on to the cans, means for propelling can ends successively into engagement with said can end propelling device and operating in time therewith, and a can carrier having means for grasping said cans, said grasping means moving in time with said second can-propelling means, and operating to reform deformed cans.

18. The combination of a chain conveyer whereby the cans are frictionally propelled, a movable timer whereby the foremost cans are successively arrested, can guiding devices, a star wheel rotating in time with the movement of said timer whereby said arrested cans are successively engaged and propelled at a relatively low speed, a second star wheel having means for engaging successively said cans in the first star wheel and propelling them at a relatively higher speed, a can end propelling device moving in time with said second star wheel and advancing can ends successively above and in line with the cans in said second star wheel and thence on to the cans, can end guiding devices, means for propelling can ends successively into engagement with said can end propelling device and operating in time therewith, a rotary turret having means for grasping said cans at one side, said grasping means moving in time with said second star wheel, a third star wheel having means for grasping said cans at their other sides and operating to reform deformed cans in conjunction with said grasping means of the turret, and means for guiding the cans from said second star wheel to said grasping devices.

In testimony whereof I have signed my name to this specification in the presence of two subscribing witnesses.

JAMES A. GRAY.

Witnesses:
N. A. ACKER,
D. B. RICHARDS.